(12) United States Patent
Yang

(10) Patent No.: US 11,256,044 B2
(45) Date of Patent: Feb. 22, 2022

(54) PARALLEL OPTICAL FIBER TRANSCEIVER MODULE

(71) Applicant: SENKO ADVANCED COMPONENTS (HONG KONG) LIMITED, Marlborough, MA (US)

(72) Inventor: Kaifa Yang, Shanghai (CN)

(73) Assignee: Senko Advanced Components, Inc., Marlborough, MA (US)

( * ) Notice: Subject to any disclaimer, the term of this patent is extended or adjusted under 35 U.S.C. 154(b) by 206 days.

(21) Appl. No.: 16/310,824

(22) PCT Filed: Jun. 22, 2017

(86) PCT No.: PCT/CN2017/089551
§ 371 (c)(1),
(2) Date: Dec. 18, 2018

(87) PCT Pub. No.: WO2017/220001
PCT Pub. Date: Dec. 28, 2017

(65) Prior Publication Data
US 2019/0196121 A1    Jun. 27, 2019

(30) Foreign Application Priority Data
Jun. 24, 2016  (CN) .......................... 201620634613.5

(51) Int. Cl.
*G02B 6/42*  (2006.01)
(52) U.S. Cl.
CPC .............. *G02B 6/423* (2013.01); *G02B 6/42* (2013.01); *G02B 6/4239* (2013.01); *G02B 6/4246* (2013.01); *G02B 6/4249* (2013.01)
(58) Field of Classification Search
CPC .... G02B 6/3644; G02B 6/448; G02B 6/4403; G02B 6/3616
See application file for complete search history.

(56) References Cited

U.S. PATENT DOCUMENTS

| 4,225,213 A | 9/1980 | McBride, Jr. et al. |
| 5,901,262 A | 5/1999 | Kobayashi et al. |

(Continued)

FOREIGN PATENT DOCUMENTS

| CN | 101587205 A | 11/2009 |
| CN | 103383482 A | 11/2013 |

(Continued)

OTHER PUBLICATIONS

Supplementary European Search Report for PCT/CN2017089552, dated Jul. 2, 2020, 10 pages.

(Continued)

*Primary Examiner* — Sung H Pak
*Assistant Examiner* — Hoang Q Tran

(57) ABSTRACT

This invention discloses a parallel optical fiber transceiver module, comprising a laser array, a photodetector array, a driving circuit board and a two-dimensional optical fiber array; the laser array and the photodetector array are mounted in two rows on the driving circuit board, and aligned and coupled with two rows of optical fibers in the fiber array respectively, and glue is used for fixing; the two-dimensional optical fiber array is fabricated on a positioning substrate with both sides etched; the invention has the following beneficial effects: through the double-sided exposure technology in the microelectronic process, a mask pattern is made on both sides of a piece of quartz glass, and then a high-precision optical fiber positioning slot array is etched through the chemical etching process. The double-exposure photoetching machine in the microelectronic process can ensure that the mask pattern on the same side has a high positioning accuracy, thus meeting the technical requirements of the parallel optical fiber transceiver module.

14 Claims, 1 Drawing Sheet

(56) References Cited

U.S. PATENT DOCUMENTS

| | | | | |
|---|---|---|---|---|
| 6,240,235 B1* | 5/2001 | Uno | ............ | C03B 11/08 |
| | | | | 385/137 |
| 6,726,372 B1* | 4/2004 | Sherrer | ............ | G02B 6/3672 |
| | | | | 385/83 |
| 7,162,124 B1 | 1/2007 | Gunn, III et al. | | |
| 7,220,065 B2* | 5/2007 | Han | ............ | G02B 6/4204 |
| | | | | 385/53 |
| 9,645,316 B1* | 5/2017 | Hasharoni | ............ | G02B 6/4246 |
| 2002/0081078 A1 | 6/2002 | Melchior et al. | | |
| 2002/0131727 A1 | 9/2002 | Reedy et al. | | |
| 2004/0114859 A1 | 6/2004 | Colgan et al. | | |
| 2005/0129367 A1 | 6/2005 | Koshinz et al. | | |
| 2005/0141823 A1 | 6/2005 | Han et al. | | |
| 2007/0071390 A1* | 3/2007 | Tobiason | ............ | G02B 6/4249 |
| | | | | 385/89 |
| 2011/0026875 A1 | 2/2011 | Bowen | | |
| 2011/0064358 A1 | 3/2011 | Nishimura | | |
| 2012/0099820 A1 | 4/2012 | Rolson et al. | | |

FOREIGN PATENT DOCUMENTS

| | | |
|---|---|---|
| CN | 103809250 A | 5/2014 |
| CN | 105372770 A | 3/2016 |
| CN | 105629374 A | 6/2016 |
| CN | 205404901 U | 7/2016 |
| WO | 2011040830 A1 | 4/2011 |

OTHER PUBLICATIONS

Extended European Search Report; Application No. 17814739.3, dated Dec. 17, 2019, pp. 44.

International Preliminary Report on Patentability for PCT/CN2017/089551, dated Jan. 3, 2019, 13 Pages.

International Preliminary Reporton Patentability for PCT/CN2017/089552, dated Jan. 3, 2019, 17 Pages.

\* cited by examiner

PARALLEL OPTICAL FIBER TRANSCEIVER MODULE

CROSS-REFERENCE TO RELATED APPLICATIONS

The present application is a national phase application of PCT/CN2017/089551 which claims priority to Chinese Patent Application No. 201620634613.5 filed Jun. 24, 2016, the disclosure of which is incorporated by reference herein.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to an optical module used in the field of optical fiber technology, particularly to a parallel optical fiber transceiver module used in the parallel optical fiber transmission system.

BACKGROUND

With the advent of the big data era, large data centers have seen rapid growth. Data centers are composed of a large number of servers. Large amounts of data exchange are required between servers. The data interconnection technology is crucial to the efficient operation of large data centers. The traditional electronic interconnection technology can not satisfy the transmission bandwidth and distance requirements, so parallel optical fiber interconnection technology is widely used in the data center. Supercomputer system is composed of a large number of parallel computing modules, a large amount of data exchange is required between the cabinets in which the computing modules are placed, and the parallel optical fiber transmission module becomes the preferred interconnection technology for the supercomputer system.

The core part of the parallel optical fiber transmission system is the parallel optical fiber transceiver module. It consists of a laser array, a photodetector array, a driving circuit board and an optical fiber array. The laser array and the photodetector array are mounted on the driving circuit board, and precisely aligned with the optical fiber array to ensure efficient coupling of optical signal. With respect to the existing parallel optical fiber transceiver modules, the first solution is that the laser array and the photodetector array are mounted in a linear array, and aligned with a one-dimensional optical fiber array; its advantage is that the manufacturing process of the one-dimensional optical fiber array is relatively simple, and its disadvantage is that the number of transceiver ports which can be achieved is reduced by half within a limited module width, thus not satisfying the market demand for high-density parallel interconnection. The second solution is that the laser array and the photodetector array are mounted in two rows, and coupled and aligned with two one-dimensional optical fiber arrays respectively; this method can increase the number of transceiver ports within a limited width, but its disadvantage is that two one-dimensional optical fiber arrays are stacked together, thus increasing the thickness of the transceiver module.

In the parallel optical fiber transceiver module, as the optical receiving aperture of the optical fiber is very small (for example, it is usually about 10 micrometers for the single-mode optical fiber), high-precision alignment between the laser array and the optical fiber array is required to ensure the coupling efficiency of the optical signal from the laser to the optical fiber; with respect to the coupling of optical signal from the optical fiber to the photodetector, as the photodetector has a larger receiving area (usually about 75 microns in diameter), there is a larger alignment tolerance.

This invention proposes a parallel optical fiber transceiver module structure, where the laser array and the photodetector array are mounted in two rows, and directly coupled with a two-dimensional optical fiber array to improve the optical fiber port alignment density; the two-dimensional optical fiber array is fabricated based on a positioning substrate with both sides etched, which can meet the requirements of the transceiver module on optical fiber positioning accuracy.

SUMMARY OF THE INVENTION

The purpose of the invention is to provide a parallel optical fiber transceiver module, which is used in a parallel optical fiber transmission system to increase the alignment density of the optical fiber ports and satisfy the technical requirements of the large data center and supercomputer system on high-density optical fiber interconnection.

The parallel optical fiber transceiver module includes a laser array, a photodetector array, a driving circuit board and a two-dimensional optical fiber array, wherein the laser array and the photodetector array are mounted in two rows on the driving circuit board, and aligned and coupled with the two rows of optical fibers in the two-dimensional fiber array respectively, and glue is used for fixing.

In the parallel optical fiber transceiver module, the emission direction of optical signal is from the laser to the optical fiber, and the receiving direction of optical signal is from the optical fiber to the photodetector. As the optical receiving aperture of the optical fiber is relatively small (for example, it is usually about 10 micrometers for the single-mode optical fiber), high-precision alignment between the laser array and the optical fiber array is required in the emission light path, so as to ensure the coupling efficiency of the optical signal from the laser to the optical fiber. In the receiving light path, as the photodetector has a larger receiving area (usually about 75 microns in diameter), there is a larger tolerance for the alignment between the optical fiber and the photodetector.

Considering the technical requirements of the parallel optical fiber transceiver module, this invention proposes a positioning substrate with both sides etched, and the two-dimensional optical fiber array fabricated based on this substrate can ensure positioning accuracy between the optical fibers in the same row, but the positioning accuracy between the two rows of optical fibers is relatively low. At the time of coupling and alignment, priority shall be given to assurance of alignment accuracy between one row of optical fibers and the laser array, while the alignment accuracy between the other row of optical fibers and the photodetector is somewhat lower; however, as described above, as the alignment tolerance of the receiving light path is larger, the coupling efficiency of optical signal can still be ensured.

Compared with the prior art, the invention has the following beneficial effects: Through the double-sided exposure technology in the microelectronic process, a mask pattern is made on both sides of a piece of quartz glass, and then a high-precision optical fiber positioning slot array is etched through the chemical etching process. The double-exposure photoetching machine in the microelectronic process can ensure that the mask pattern on the same side has a high positioning accuracy, and the positioning accuracy is relatively low between the patters on the two sides, but there is still sufficient accuracy to meet the technical requirements of the parallel optical fiber transceiver module.

In the figures: 1—laser array, 2—photodetector array, 3—driving circuit board, 4—two-dimensional optical fiber array, 5—positioning substrate, 6—positioning slot.

DETAILED DESCRIPTION

The technical solution of the patent is further described in detail below in combination with the specific embodiments.

Figure 1:
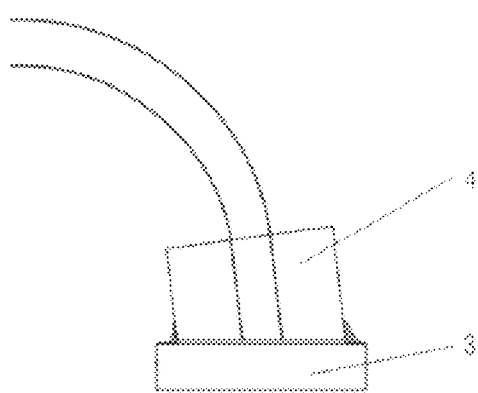
FIG. 1 shows the structure of the parallel optical fiber transceiver module of this invention.

As shown in FIG. 1, the optical fiber transceiver module of this invention comprises a driving circuit board 3 on which a laser array 1 and a photodetector array 2 are mounted, a two-dimensional optical fiber array 4, and the two-dimensional optical fiber array 4 is coupled and aligned with the laser array 1 and the photodetector array 2, and glue is used for fixing.

Figure 2:
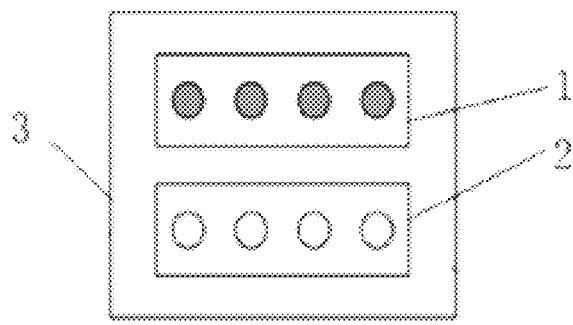
FIG. 2 shows the circuit board on which the laser array and the photodetector array are mounted.
Figure 3:
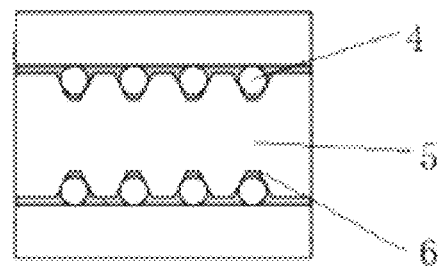
FIG. 3 is a schematic view of the structure of the two-dimensional optical fiber array of this invention.

The laser array 1 and the photodetector array 2 are mounted in two rows on the driving circuit board 3, as shown in FIG. 2. The two-dimensional optical fiber array 4 is fabricated based on a positioning substrate 5 with both sides etched, whose end face is shown in FIG. 3. The two-dimensional optical fiber array 4 is arranged in two rows, whose spacing correspond respectively to spacing of the laser array 1 and spacing of the photodetector array 2 in FIG. 2.

Figure 4:
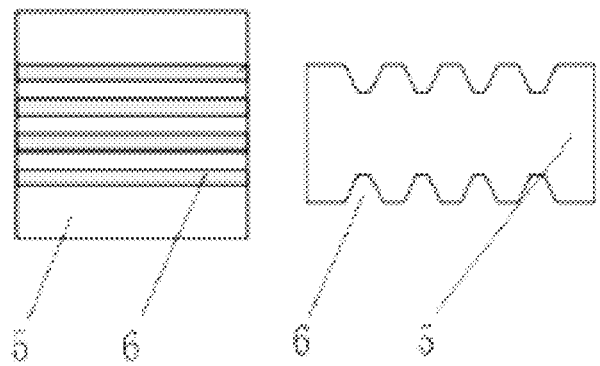
FIG. 4 is a schematic view of the structure of the positioning substrate of this invention.
Figure 5:
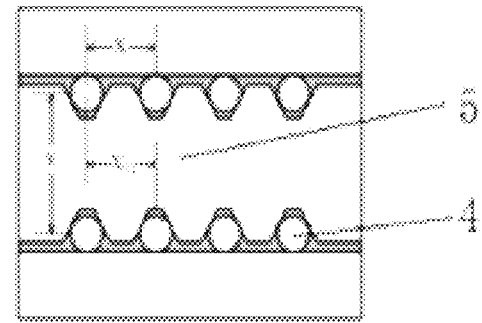
FIG. 5 gives the parameters describing the optical fiber positioning accuracy.

The positioning substrate 5 with both sides etched is shown in FIG. 4. Through the double-sided exposure technology in the microelectronic process, a mask pattern is made on both sides of a piece of quartz glass, and then a high-precision optical fiber positioning slot 6 is etched through the chemical etching process. The characteristics of the double-sided exposure technology determine that the mask pattern on the same surface is formed with one exposure, so the pattern has a high positioning accuracy; however, due to the mechanical flipping in the process, the accuracy of the relative position between the mask patterns on the two surfaces is slightly lower. The optical fiber positioning accuracy parameters are shown in FIG. 5. The spacing, X, between the optical fibers in the same row has a high accuracy, with a tolerance generally as small as 0.5 micron or less; the relative spacings, Y and $X_{12}$, between two different rows of optical fibers have relatively lower accuracy, generally with tolerances of 5 and 2 microns respectively.

When the two-dimensional optical fiber array 4 fabricated based on the positioning substrate 5 with both sides etched is used in a parallel optical fiber transceiver module, high-precision alignment between the laser array 1 and one row of optical fibers shall be firstly ensured for high coupling efficiency of optical signal of the emission light path; in the receiving light path, the optical signal is transmitted from the other row of optical fibers to the photodetector array 2. As the optical receiving area of the photodetector array 2 is larger and has greater tolerance for the light path alignment, a higher optical signal coupling efficiency can still be obtained.

The preferred embodiments of this patent have been described above in detail, but this patent is not limited to the above embodiments.

Various changes may be made by those of ordinary skill in the art without departing from the scope of this patent.

The invention claimed is:

1. A parallel optical fiber transceiver module used in a parallel optical fiber transmission system, the parallel optical fiber transceiver module comprising:
   a laser array,
   a photodetector array,
   a driving circuit board, and
   a two-dimensional optical fiber array,
   wherein the laser array comprises a plurality of laser elements spaced apart along the driving circuit board in a first board row;
   wherein the photodetector array comprises a plurality of photodetectors spaced apart along the driving circuit board in a second board row parallel to the first board row;
   wherein the two dimensional optical fiber array comprises a plurality of optical fibers and a positioning substrate, each of the plurality of fibers having an end, the positioning substrate having a first side portion, a second side portion, and a thickness extending from the first side portion to the second side portion, the plurality of optical fibers comprising a first set of fibers retained on the first side portion of the positioning substrate such that the ends of the first set of fibers are spaced apart in a first single-file fiber row, the plurality of optical fibers comprising a second set of fibers retained on the second side portion of the positioning substrate such that the ends of the second set of fibers are spaced apart in a second single-file fiber row parallel to the first single-file fiber row, wherein the positioning substrate extends uninterrupted between the first single-file fiber row and the second single-file fiber row;
   wherein the two dimensional optical fiber array is connected to the driving circuit board such that the ends of the first set of fibers directly oppose and face the plurality of laser elements such that the plurality of laser elements are configured to output signals directly to the ends of the first set of fibers without changing direction and the ends of the second set of fibers directly oppose and face the plurality of photodetectors such that the second set of fibers are configured to output signals directly to the photodetectors without changing direction; and
   wherein the parallel optical fiber transceiver module further comprises glue fixing the two dimensional optical fiber array directly to the driving circuit board.

2. A parallel optical fiber transceiver module according to claim 1, wherein the positioning substrate is made of a piece of quartz glass and wherein the positioning substrate comprises a plurality of parallel etched positioning slots on each of the first and second side portions.

3. A parallel optical fiber transceiver module according to claim 1, wherein the ends of adjacent fibers of the first set of fibers are spaced apart in the first single-file fiber row by a spacing distance, X, and wherein the ends of adjacent fibers of the second set of fibers are spaced apart in the second single-file fiber row by the spacing distance, X, wherein the spacing distance, X, has a tolerance of equal or less than 0.5 micron.

4. A parallel optical fiber transceiver module according to claim 3 wherein the first single-file fiber row is spaced apart from the second single-file fiber row by a spacing distance, Y, and the spacing distance, Y, has a tolerance that is greater than the tolerance of the spacing distance, X.

5. A method of making a parallel optical fiber transceiver module in a parallel optical fiber transmission system, the method comprising:
providing a laser array, a photodetector array, and a driving circuit board, wherein the laser array comprises a plurality of laser elements spaced apart along the driving circuit board in a first board row and wherein the photodetector array comprises a plurality of photodetectors spaced apart along the driving circuit board in a second board row parallel to the first board row;
forming a two-dimensional optical fiber array by retaining a first set of fibers on a first side portion of a positioning substrate such that ends of the first set of fibers are spaced apart in a first single-file fiber row and retaining a second set of fibers on a second side portion of the positioning substrate such that ends of the ends of second set of fibers are spaced apart in a second single-file fiber row parallel to the first single-file fiber row, wherein the positioning substrate extends uninterrupted between the first single-file fiber row and the second single-file fiber row, and
fixing the two dimensional optical fiber array to the driving circuit board with glue such that the ends of the first set of fibers directly oppose and face the plurality of laser elements such that the plurality of laser elements are configured to output signals directly to the ends of the first set of fibers without changing direction and the ends of the second set of fibers directly oppose and face the plurality of photodetectors such that the second set of fibers are configured to output signals directly to the photodetectors without changing direction.

6. The method according to claim 5, wherein the positioning substrate is made of a piece of quartz glass and the method further comprises using a double-sided exposure technology in a microelectronic process to form a respective mask pattern on each of the first and second side portions of the positioning substrate, and then forming a high-precision optical fiber positioning slot array on each of the first and second side portions by a chemical etching process.

7. The method according to claim 5, wherein the ends of adjacent fibers of the first set of fibers are spaced apart in the first single-file fiber row by a spacing distance, X, and wherein the ends of adjacent fibers of the second set of fibers are spaced apart in the second single-file fiber row by the spacing distance, X, wherein the spacing distance, X, has a tolerance of equal or less than 0.5 micron.

8. The method according to claim 7 wherein the first single-file fiber row is spaced apart from the second single-file fiber row by a spacing distance, Y, and the spacing distance, Y, has a tolerance that is greater than the tolerance of the spacing distance, X.

9. A parallel optical fiber transceiver module according to claim 3, wherein each of the first and second single-file fiber rows is oriented parallel to a fiber spacing axis, and wherein the end of each of a plurality of the fibers in the first single-file fiber row is offset from the end of each of a corresponding plurality of the fibers in the second row by a spacing distance, X12, along the fiber spacing axis, and wherein the spacing distance X12 has a tolerance that is greater than the tolerance of the spacing distance, X.

10. The method according to claim 7, wherein each of the first and second single-file fiber rows is oriented parallel to a fiber spacing axis, and wherein the end of each of a plurality of the fibers in the first single-file fiber row is offset from the end of each of a corresponding plurality of the fibers in the second single-file fiber row by a spacing distance, X12, along the fiber spacing axis, and wherein the spacing distance X12 has a tolerance that is greater than the tolerance of the spacing distance, X.

11. A parallel optical fiber transceiver module according to claim 1, wherein the laser array and the photodetector array are on a surface of the driving circuit board and the glue is bonded to said surface and at least one component of the two dimensional optical fiber array in direct contact with at least one of the first set of fibers and the second set of fibers.

12. A parallel optical fiber transceiver module according to claim 1, wherein the two dimensional optical fiber array consists of the substrate, the first set of fibers, the second set of fibers, and retention material holding the first set of fibers on the first side portion of the substrate and the second set of fibers on the second side portion of the substrate.

13. The method according to claim 5, wherein the laser array and the photodetector array are on a surface of the driving circuit board and the glue bonds to said surface and at least one component of the two dimensional optical fiber array in direct contact with at least one of the first set of fibers and the second set of fibers.

14. The method according to claim 5, wherein the two dimensional optical fiber array consists of the substrate, the first set of fibers, the second set of fibers, and retention material holding the first set of fibers on the first side portion of the substrate and the second set of fibers on the second side portion of the substrate.

* * * * *